United States Patent
Kokubu et al.

(10) Patent No.: US 8,812,504 B2
(45) Date of Patent: Aug. 19, 2014

(54) KEYWORD PRESENTATION APPARATUS AND METHOD

(75) Inventors: Tomoharu Kokubu, Kawasaki (JP); Toshihiko Manabe, Kamakura (JP); Kosei Fume, Kawasaki (JP); Wataru Nakano, Kawasaki (JP); Hiromi Wakaki, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 259 days.

(21) Appl. No.: 13/216,380

(22) Filed: Aug. 24, 2011

(65) Prior Publication Data

US 2012/0078907 A1 Mar. 29, 2012

(30) Foreign Application Priority Data

Sep. 28, 2010 (JP) .................................. 2010-217899

(51) Int. Cl.
*G06F 17/00* (2006.01)
*G06F 17/30* (2006.01)

(52) U.S. Cl.
USPC ........................................................ 707/737

(58) Field of Classification Search
None
See application file for complete search history.

(56) References Cited

U.S. PATENT DOCUMENTS

| | | | |
|---|---|---|---|
| 2004/0205457 A1* | 10/2004 | Bent et al. .................... | 715/500 |
| 2010/0100543 A1* | 4/2010 | Brady .......................... | 707/732 |

FOREIGN PATENT DOCUMENTS

| | | |
|---|---|---|
| JP | 2005-063298 A | 3/2005 |
| JP | 3665480 | 4/2005 |
| JP | 2005-251091 A | 9/2005 |
| JP | 2007-079948 A | 3/2007 |
| JP | 2007-128389 A | 5/2007 |
| JP | 2009-003888 A | 1/2009 |
| JP | 2010-157102 A | 7/2010 |
| WO | 2006-048998 A1 | 5/2006 |

OTHER PUBLICATIONS

Frantzi, et al., "*Extracting Nested Collocations*"; Proceedings of 16th International Conference on Computional Linguistics, 1996, pp. 41-46.
Robertson, et al., "*Simple, proven approaches to text retrieval*", University of Cambridge, Computer Laboratory, Technocal Report, No. 356, Dec. 1994, pp. 1-8.
Office Action dated May 29, 2012 from corresponding JP 2010-217899.

* cited by examiner

*Primary Examiner* — Uyen Le
(74) *Attorney, Agent, or Firm* — Ohlandt, Greeley, Ruggiero & Perle, L.L.P.

(57) ABSTRACT

According to one embodiment, a keyword presentation apparatus includes an extraction unit, a selection unit and a clustering unit. The extraction unit is configured to extract, as technical terms, morpheme strings, which are not defined in a general concept dictionary, from a document set. The selection unit is configured to evaluate relevancies between each of basic term candidates and the technical terms, and to preferentially select basic term candidates having high relevancies as basic terms. The clustering unit is configured to calculate weighted sums of statistical degrees of correlation between the basic terms based on the document set, to calculate conceptual degrees of correlation between the basic terms based on the general concept dictionary, and to cluster the basic terms based on the weighted sums.

10 Claims, 13 Drawing Sheets

| Document ID | 1 |
|---|---|
| Title | Error was occurred in unit inspection of image search |
| Body text | During unit inspection of image search engine today, server went down.<br>XYZ is considered to be cause. |

Image search
Unit inspection
Error processing
Basic design
Screen display
Video processing
Unit test
Detailed design
Information extraction
Document search
Conceptual search
Full text search
General inspection
Combined test
Image processing
Document classification
Lexical index
、 、 、 、

F I G. 6

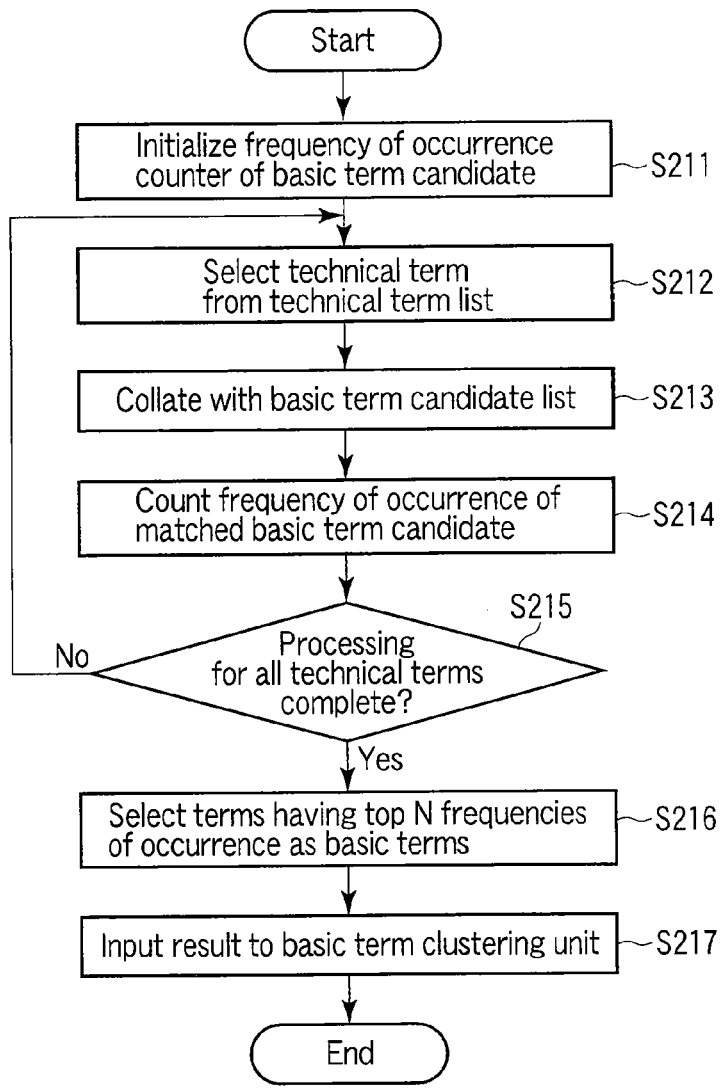
F I G. 7
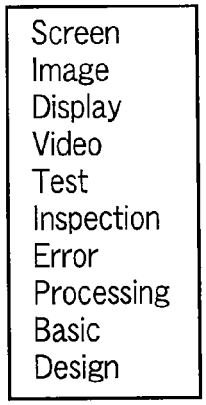
F I G. 8

|  | Screen | Image | Display | Video | Unit | Inspection | Error | Processing | Basic | Design |
|---|---|---|---|---|---|---|---|---|---|---|
| Screen |  | 0.45 | 0.41 | 0.5 | 0.2 | 0.1 | 0.1 | 0.31 | 0.2 | 0.1 |
| Image |  |  | 0.42 | 0.3 | 0.1 | 0.1 | 0.1 | 0.1 | 0.1 | 0.2 |
| Display |  |  |  | 0.34 | 0.1 | 0.1 | 0.1 | 0.32 | 0.1 | 0.2 |
| Video |  |  |  |  | 0.1 | 0.1 | 0.2 | 0.33 | 0.05 | 0.2 |
| Test |  |  |  |  |  | 0.44 | 0.24 | 0.25 | 0.2 | 0.25 |
| Inspection |  |  |  |  |  |  | 0.41 | 0.2 | 0.1 | 0.2 |
| Error |  |  |  |  |  |  |  | 0.3 | 0.1 | 0.1 |
| Processing |  |  |  |  |  |  |  |  | 0.2 | 0.2 |
| Basic |  |  |  |  |  |  |  |  |  | 0.35 |
| Design |  |  |  |  |  |  |  |  |  |  |

FIG. 11

| Cluster ID | Basic term which configures cluster |
|---|---|
| 1 | Screen, image, display, video, processing |
| 2 | Test, inspection, error |
| 3 | Basic, design |

FIG. 12

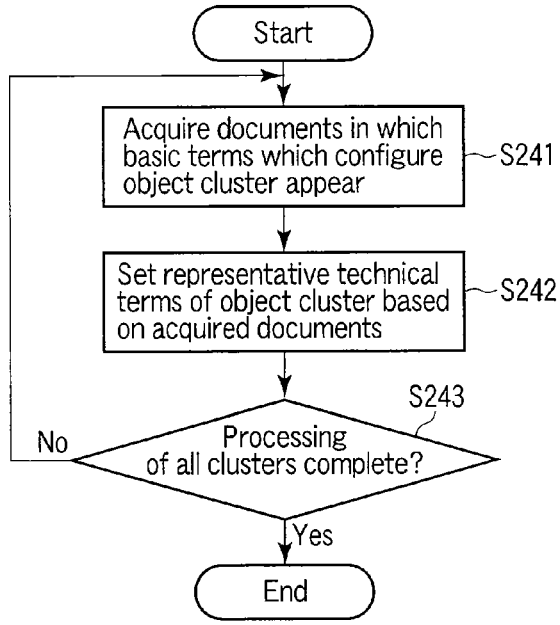

F I G. 13

| Cluster ID | Basic term which configures cluster | Cluster representative technical term |
|---|---|---|
| 1 | Screen, image, display, video, processing | Image search, screen display, video processing |
| 2 | Test, inspection, error | Unit test, general inspection, error processing |
| 3 | Basic, design | Basic design, detailed design |

F I G. 14

| Screen | Image | Display | Image search | Screen display | Video processing |
| Test | Inspection | Error | Unit test | General inspection | Error processing |
| Basic | Design | | Basic design | Detailed design | |

F I G. 15

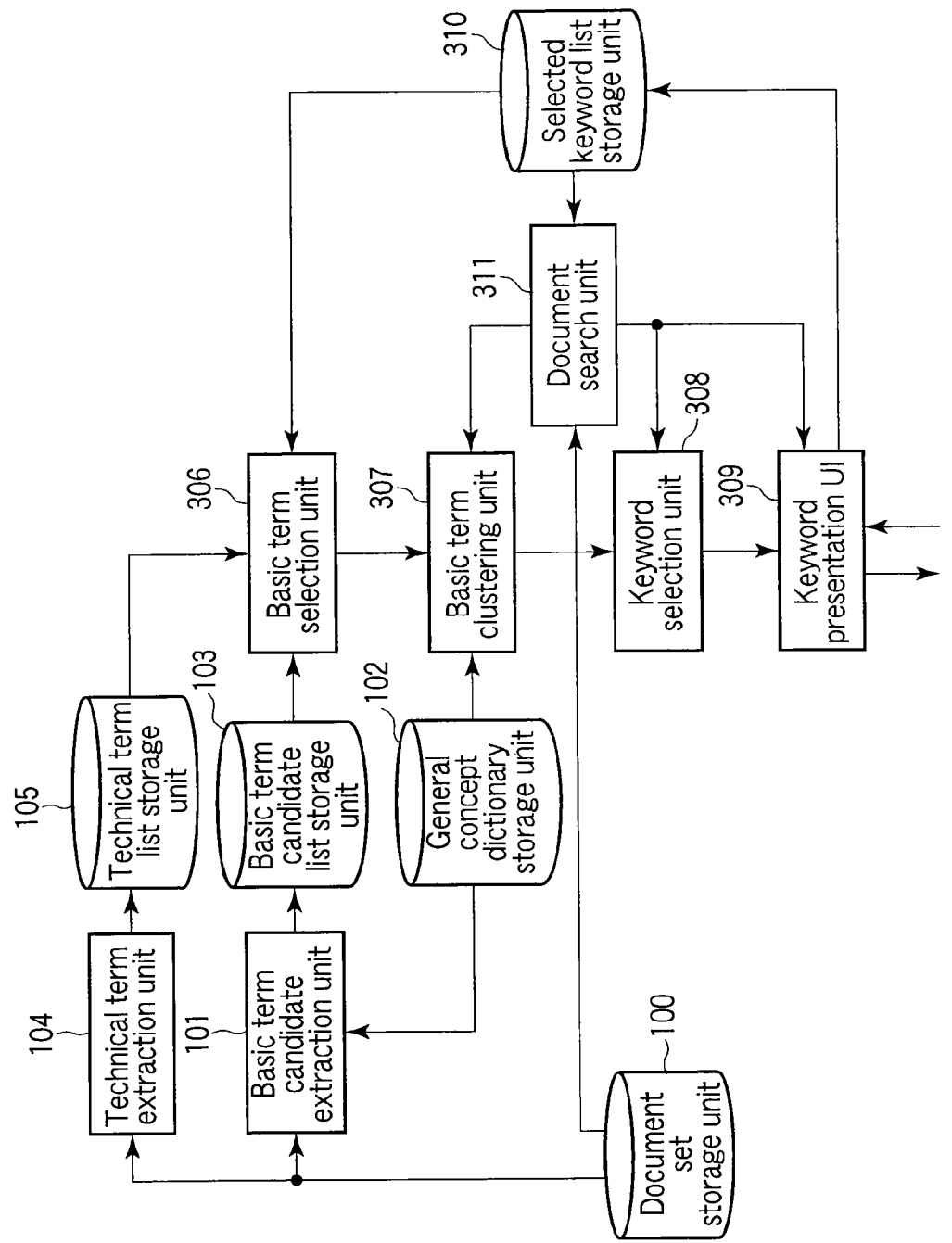
F I G. 16

| Immediately previously selected keyword | Selection lexical category |
|---|---|
| Sahen-nouns | Other nouns |
| Technical term | Sahen-nouns + Other nouns |
| None | Sahen-nouns |
| Other nouns | Sahen-nouns |

F I G. 18

F I G. 19

☐ "Display"  ☐ "Processing"  ☐ "Image processing"  ☐ "Screen display"

☐ "Test"  ☐ "Inspection"  ☐ "Unit test"  ☐ "General inspection"  ☐ "Combined test"

☐ "Search"  ☐ "Classification"  ☐ "Extraction"  ☐ "Image search"  ☐ "Document classification"  ☐ "Information extraction"

F I G. 20

☐"Document" ☐"Concept" ☐"Full text" ☐"Document search" ☐"Conceptual search" ☐"Lexical index"

☐"Image" ☐"Screen" ☐"Image search" ☐"Image index"

☐"Unit" ☐"Error" ☐"Basic" ☐"Search error" ☐"Basic design" ☐"Detailed design"

Error was occurred during unit inspection of image search

About document search speed

Conceptual search algorithm

. . . . . . . . . . . . . . .

F I G. 21

| Log 1 | Search |
|---|---|
| Log 2 | Lexical index |

F I G. 22

US 8,812,504 B2

KEYWORD PRESENTATION APPARATUS AND METHOD

CROSS-REFERENCE TO RELATED APPLICATIONS

This application is based upon and claims the benefit of priority from prior Japanese Patent Application No. 2010-217899, filed Sep. 28, 2010, the entire contents of which are incorporated herein by reference.

FIELD

Embodiments described herein relate generally to a technique of extracting keywords from a set of electronic documents, and presenting the extracted keywords.

BACKGROUND

In recent years, the use of electronic documents has become increasingly common. In general, electronic documents easily undergo information processes such as analysis and search processes compared to normal printed documents. For example, when keywords are extracted from an electronic document set and are presented, the user can easily recognize an overview of the electronic document set without browsing each individual electronic document included in the electronic document set. Furthermore, the user can easily perform a refined search of a set of electronic documents by use of the keywords.

Various techniques for extracting keywords from electronic documents have been proposed. More specifically, a technique of extracting keywords based on statistical features such as frequencies of occurrence in electronic documents is known. For example, terms having higher frequencies of occurrence in an electronic document set are extracted as keywords. Also, a technique of grouping keywords based on the degrees of correlation among them and presenting keyword groups in place of simply enumerating and presenting extracted keywords is known. Grouping of keywords is helpful to ascertain an overview of the electronic document set.

The technique of extracting keywords based on statistical features such as the frequencies of occurrence tends to extract technical terms not easier than basic terms. In general, technical terms are helpful to conduct a detailed refined search of an electronic document set compared to basic terms. Upon grouping and hierarchizing keywords based on co-occurrence relationships between keywords, co-occurrence relationships between basic terms having higher frequencies of occurrence are easily determined. Furthermore, keyword extraction based on statistical features is suited to a large-scale electronic document set such as Web pages, but is not always suited to a small-scale electronic document set such as in-house documents.

BRIEF DESCRIPTION OF THE DRAWINGS

FIG. 6 is a view exemplifying a technical term list stored in a technical term list storage unit in FIG. 1;

FIG. 7 is a flowchart exemplifying the operation of a basic term selection unit in FIG. 1;

FIG. 8 is a view exemplifying basic terms selected by the basic term selection unit in FIG. 1;

FIG. 11 exemplifies a correlation degree table;

FIG. 12 is a table exemplifying the basic term clustering result by the basic term clustering unit in FIG. 1;

FIG. 13 is a flowchart exemplifying the operation of a keyword selection unit in FIG. 1;

FIG. 14 is a table exemplifying the selection results of representative technical terms by the keyword selection unit in FIG. 1;

FIG. 15 is a view showing a presentation example of keywords by a keyword presentation UI in FIG. 1;

FIG. 16 is a block diagram exemplifying a keyword presentation apparatus according to the second embodiment;

FIG. 18 is an explanatory view of selection lexical category setting rules;

FIG. 19 is a view exemplifying a selected keyword list stored in a selected keyword list storage unit in FIG. 16;

FIG. 20 is a view showing a presentation example of keywords by a keyword presentation UI in FIG. 16;

FIG. 21 is a view showing a presentation example of keywords by the keyword presentation UI in FIG. 16; and FIG. 22 is a view exemplifying a selected keyword list stored in the selected keyword list storage unit in FIG. 16.

DETAILED DESCRIPTION

Embodiments will be described hereinafter with reference to the drawings.

In general, according to one embodiment, a keyword presentation apparatus includes a first extraction unit, a second extraction unit, a first selection unit, a clustering unit, a second selection unit and a presentation unit. The first extraction unit is configured to extract, as basic term candidates, morpheme strings, which are defined in a predetermined general concept dictionary, from a document set. The second extraction unit is configured to extract, as technical terms, morpheme strings, which are not defined in the general concept dictionary, from the document set. The first selection unit is configured to evaluate relevancies between each of the basic term candidates and the technical terms, and to preferentially select basic term candidates having high relevancies as basic terms. The clustering unit is configured to calculate weighted sums of statistical degrees of correlation between the basic terms based on the document set, to calculate conceptual degrees of correlation between the basic terms based on the general concept dictionary, and to cluster the basic terms based on the weighted sums. The second selection unit is configured to select keywords of respective clusters from the basic terms and the technical terms based on a clustering result of the basic terms. The presentation unit is configured to present selected keywords.

Note that in the following description the term "document" refers to an electronic document.

First Embodiment

Figures 1, 2:
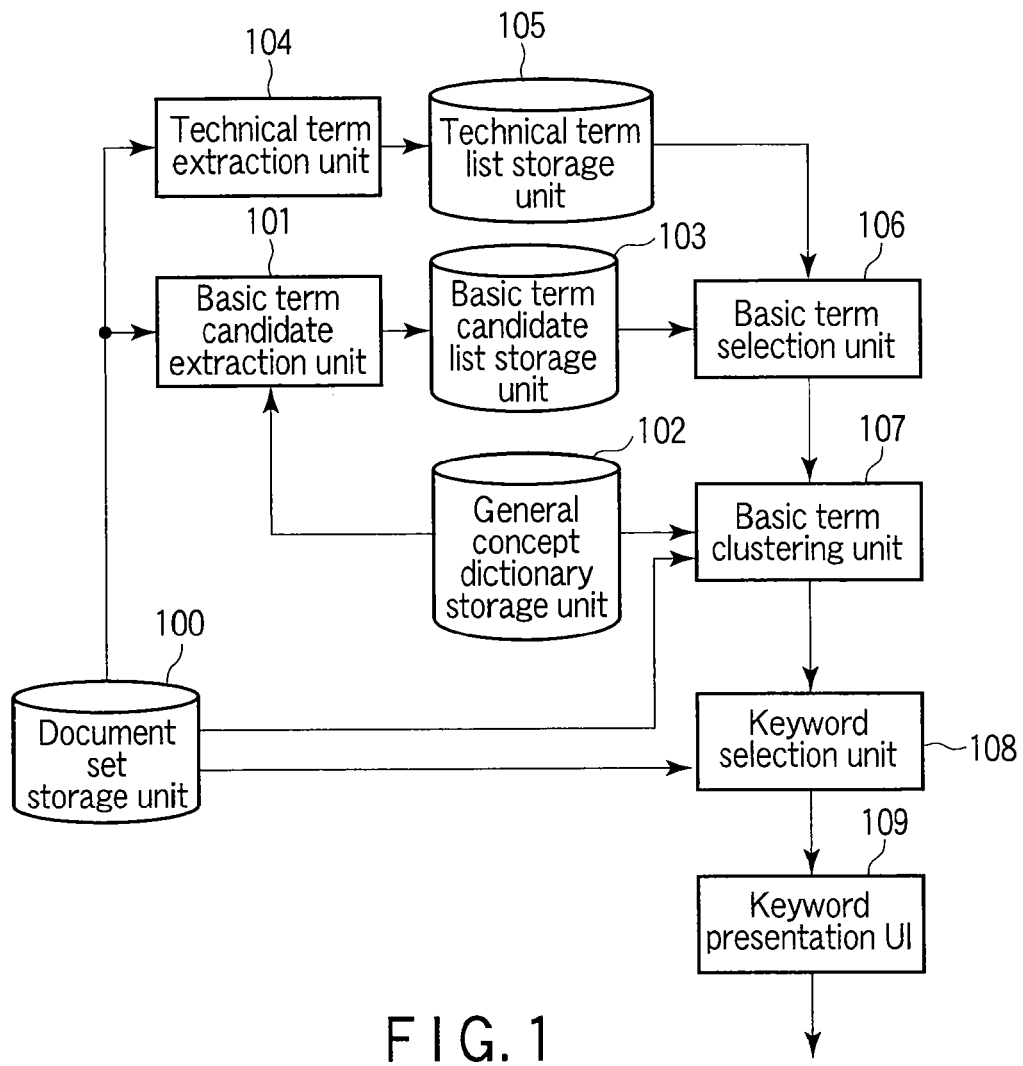
FIG. 1 is a block diagram exemplifying a keyword presentation apparatus according to the first embodiment.
FIG. 2 is a view exemplifying a document stored in a document set storage unit in FIG. 1.

As shown in FIG. 1, a keyword presentation apparatus according to the first embodiment includes a document set storage unit 100, basic term candidate extraction unit 101, general concept dictionary storage unit 102, basic term candidate list storage unit 103, technical term extraction unit 104, technical term list storage unit 105, basic term selection unit 106, basic term clustering unit 107, keyword selection unit 108, and keyword presentation user interface (UI) 109.

The document set storage unit 100 stores an arbitrary number of documents. Note that the keyword presentation apparatus according to this embodiment is suited to both large- and small-scale document sets, as will be described later. A document set stored in the document set storage unit 100 is read out as needed by the basic term candidate extraction unit 101, technical term extraction unit 104, basic term clustering unit 107, and keyword selection unit 108.

For example, the document set storage unit 100 stores a document set including a document shown in FIG. 2. Typically, document IDs are assigned to respective documents to identify them, but documents may be identified by other techniques. Also, in another processing to be described later (for example, term extraction), "title" and "body text" fields may or may not be distinguished. Furthermore, fields need not be set in each document, or fields which are not shown in FIG. 2 may be set.

The basic term candidate extraction unit 101 reads out a document set from the document set storage unit 100, and extracts basic term candidates. More specifically, the basic term candidate extraction unit 101 extracts basic term candidates from the document set with reference to a general concept dictionary stored in the general concept dictionary storage unit 102. As will be described later, basic term candidates are any of terms defined in the general concept dictionary. For example, the basic term candidate extraction unit 101 applies morphological analysis to documents included in the document set to extract, as basic term candidates, morpheme strings which match a predetermined part of speech and are defined in the general concept dictionary. The basic term candidate extraction unit 101 stores the extracted basic term candidates in the basic term candidate list storage unit 103.

Figure 3:
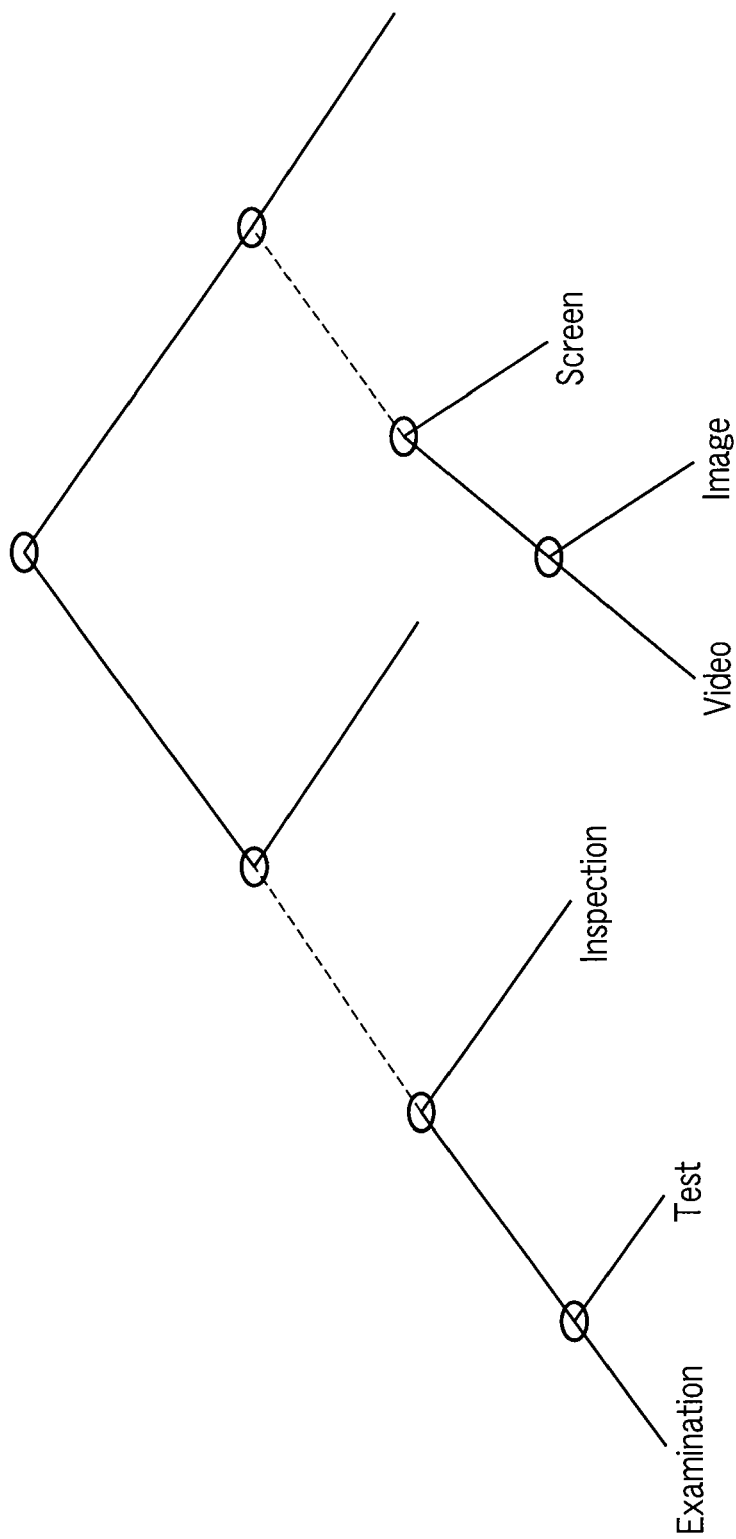
FIG. 3 is a table exemplifying a general concept dictionary stored in a general concept dictionary storage unit in FIG. 1.

The general concept dictionary storage unit 102 stores, for example, the general concept dictionary shown in FIG. 3. The general concept dictionary specifies conceptual relationships (hierarchical relationships) among terms. For example, according to FIG. 3, terms "examination" and "test" are related to have the same concept, and a parent node of these terms is related to have the same concept as a term "inspection". Furthermore, according to FIG. 3, terms "video" and "image" are related to have the same concept, and a parent node of these terms is related to have the same concept as a term "screen". According to the general concept dictionary shown in FIG. 3, a conceptual degree of correlation between terms can be estimated by a distance (the total number of edges) between term nodes. Note that the general concept dictionary may be uniquely prepared. However, for example, an existing electronic dictionary research (EDR) concept dictionary may be used.

Figure 4:
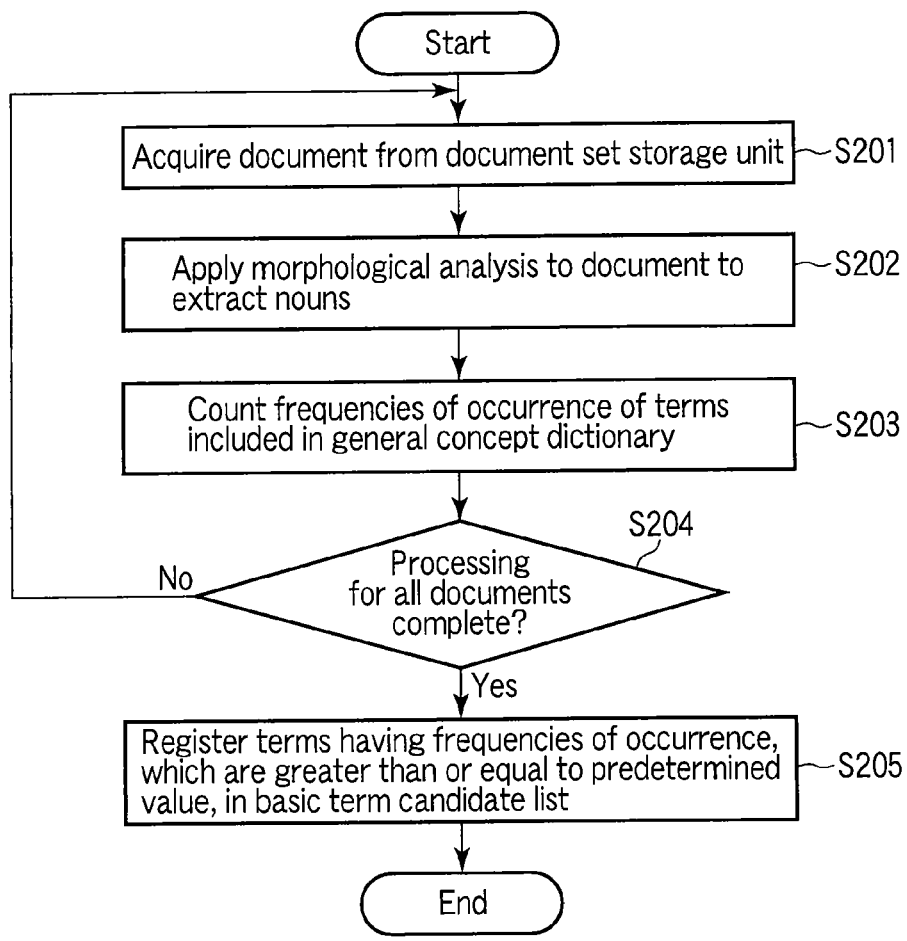
FIG. 4 is a flowchart exemplifying the operation of a basic term candidate extraction unit in FIG. 1.

An operation example of the basic term candidate extraction unit 101 will be described below with reference to FIG. 4. When the operation of the basic term candidate extraction unit 101 starts, the process advances to step S201.

In step S201, the basic term candidate extraction unit 101 acquires an object document in the document set from the document set storage unit 100. The basic term candidate extraction unit 101 applies morphological analysis to the object document acquired in step S201 to extract nouns (or a predetermined part of speech other than a noun may be used) included in the object document (step S202). The basic term candidate extraction unit 101 counts the frequencies of occurrence of terms defined in the general concept dictionary stored in the general concept dictionary storage unit 102 with regard to all the nouns extracted in step S202 (step S203). For step S203, the basic term candidate extraction unit 101 may additionally perform processing for excluding specific terms defined in the general concept dictionary from a frequency of occurrence count object with reference to a predetermined stop word list.

For example, the basic term candidate extraction unit 101 applies morphological analysis to the document shown in FIG. 2 in step S202 to extract nouns "document", "classification", "unit", "inspection", "error", and "occurrence" from a "title" field, and nouns "today", "document", "classification", "engine", "unit", "inspection", "server", "down", "XYZ", and "cause" from a "body text" field. Then, the basic term candidate extraction unit 101 counts the frequencies of occurrence of terms defined in the general concept dictionary for these extraction results in step S203 to obtain results "document: 2", "classification: 2", "unit: 2", "inspection: 2", "error: 1", "occurrence: 1", "today: 1", "engine: 1", "server: 1", "down: 1", and "cause: 1". Note that the term "XYZ" is not defined in the general concept dictionary, and its frequency of occurrence is not counted.

Figure 5:
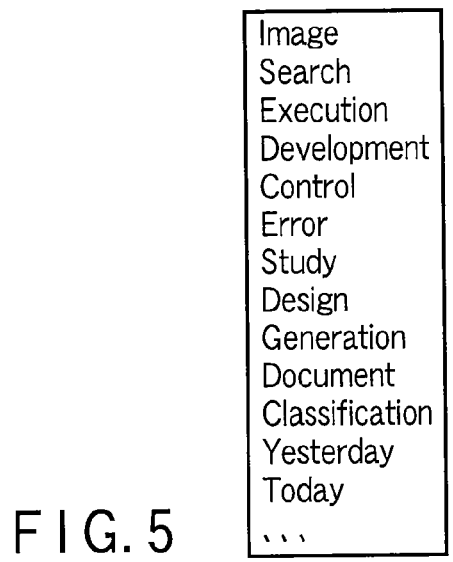
FIG. 5 is a view exemplifying a basic term candidate list stored in a basic term candidate list storage unit in FIG. 1.

If the processing for all documents is complete, the process advances to step S205; otherwise, the process returns to step S201. That is, the basic term candidate extraction unit 101 applies the processes in steps S201 to S203 to all documents included in the document set. Consequently, total frequencies of occurrence of terms defined in the general concept dictionary in the document set are derived. In step S205, the basic term candidate extraction unit 101 extracts terms having total frequencies of occurrence, which are greater than or equal to a predetermined value, as basic term candidates, and stores them in the basic term candidate list storage unit 103. Alternatively, the basic term candidate extraction unit 101 may extract a predetermined number of terms in descending order of total frequency of occurrence as basic term candidates. The basic term candidates extracted by the basic term candidate extraction unit 101 are stored in the basic term candidate list storage unit 103, for example, in a list format shown in FIG. 5.

The technical term extraction unit 104 reads out a document set from the document set storage unit 100, and extracts technical terms (or compound terms). The technical terms are those which are not defined at least in the general concept dictionary. For example, the technical term extraction unit 104 determines based on appearance patterns of morpheme strings in the document set whether or not each morpheme string is an independent term. Then, the technical term extraction unit 104 extracts a morpheme string, which is determined as an independent term, and is not defined in the general concept dictionary, as a technical term.

A practical technique required to extract a technical term is exemplified in a reference (Frantzi, T. K., and Ananiadous, S. 1996. "Extracting Nested Collocations". Proceedings of 16th International Conference on Computational Linguistics, pp 41-46). This technique extracts a technical term using an evaluation value called a "C-value". A C-value (w) for a morpheme string w, which appears in the document set, is defined by:

$$C-\text{value}(w) = (1(w) - 1) * \left(n(w) - \frac{t(w)}{c(w)}\right) \qquad (1)$$

where l(w) represents the number of morphemes (morpheme length) of the morpheme string w, n(w) represents the frequency of occurrence of the morpheme string w, t(w) represents the frequency occurrence of a longer morpheme string including the morpheme string w, and c(w) represents the number of types of the longer morpheme strings including the morpheme string w.

The technical term extraction unit 104 extracts morpheme strings having C-values, which are greater than or equal to a predetermined value, as technical terms, and stores them in the technical term list storage unit 105. Alternatively, the technical term extraction unit 104 may extract a predetermined number of morpheme strings in descending order of C-value as technical terms. The technical term extraction unit 104 stores the extracted technical terms in the technical term list storage unit 105, for example, in a list format shown in FIG. 6. Note that the technical term extraction unit 104 may exclude a specific morpheme string from a C-value calculation object with reference to a stop word list, which is prepared in advance.

The basic term selection unit 106 selects basic terms from the basic term candidates stored in the basic term candidate list storage unit 103. More specifically, the basic term selection unit 106 selects, as basic terms, basic term candidates which have high relevancies with the technical terms stored in the technical term list storage unit 105.

An operation example of the basic term selection unit 106 will be described below with reference to FIG. 7.

The basic term selection unit 106 initializes a frequency of occurrence counter of each basic term candidate stored in the basic term candidate list storage unit 103 (for example, it sets 0) (step S211), and the process advances to step S212.

In step S212, the basic term selection unit 106 selects an object technical term in the technical term list stored in the technical term list storage unit 105. The basic term selection unit 106 collates the object technical term selected in step S212 with the basic term candidate list stored in the basic term candidate list storage unit 103 (step S213). The basic term selection unit 106 counts the frequencies of occurrence of basic term candidates which match parts (that is, partial character strings) of the object technical term (step S214).

For example, the basic term selection unit 106 selects "image search" as the object technical term (step S212), and collates the object technical term "image search" with the basic term candidate list (step S213), and counts the frequencies of occurrence of basic term candidates "image" and "search" which match parts of the object technical term "image search" by 1, respectively.

If processing for all technical terms is complete, the process advances to step S216; otherwise, the process returns to step S212. That is, the basic term selection unit 106 applies the processes in steps S212 to S214 to all technical terms included in the technical term list. Consequently, relevancies of respective basic term candidates to all the technical terms are estimated. In step S216, the basic term selection unit 106 selects N (N is an arbitrary natural number) basic term candidates in descending order of frequency of occurrence as basic terms. FIG. 8 exemplifies the basic term selection results when N=10. Alternatively, the basic term selection unit 106 may select basic term candidates having frequencies of occurrence, which are greater than or equal to a predetermined value, as basic terms. The basic term selection unit 106 inputs the basic terms selected in step S216 to the basic term clustering unit 107 (step S217).

Note that the example in FIG. 7 evaluates the relevancies of respective basic term candidates with respect to all technical terms based on the number of matches with partial character strings of the technical terms. Alternatively, the relevancies may be evaluated by other techniques. For example, surrounding character strings including technical terms (for example, a technical term and M [M is an arbitrary natural number] characters that appear before and after the technical term) may be extracted from the document set, and relevancies may be evaluated by collating the surrounding character strings with the basic term candidate list. Alternatively, sentences including technical terms may be extracted from the document set, and relevancies may be evaluated based on modification relationships obtained by applying syntax analysis to the sentences. For example, the frequencies of occurrence of basic term candidates which have modification relationships with technical terms in the respective sentences are counted, and relevancies may be evaluated based on the frequencies of occurrence. Upon evaluation of the relevancies based on the modification relationships, for example, when a technical term suggests "action", a basic term which suggests "object" of that "action" tends to be selected, and when a technical term suggests "object", a basic term which suggests "action" on that "object" tends to be selected. That is, since the basic term—technical term relationship ("action"—"object" or "object"—"action") is clarified, it is helpful to recognize an overview of the document set upon presentation of keywords. Note that these techniques may be used independently or in combination.

The basic term clustering unit 107 clusters the basic terms selected by the basic term selection unit 106 to generate a plurality of clusters. Each cluster is formed by one or a plurality of basic terms. The basic term clustering unit 107 inputs the clustering result to the keyword selection unit 108.

Figure 9:
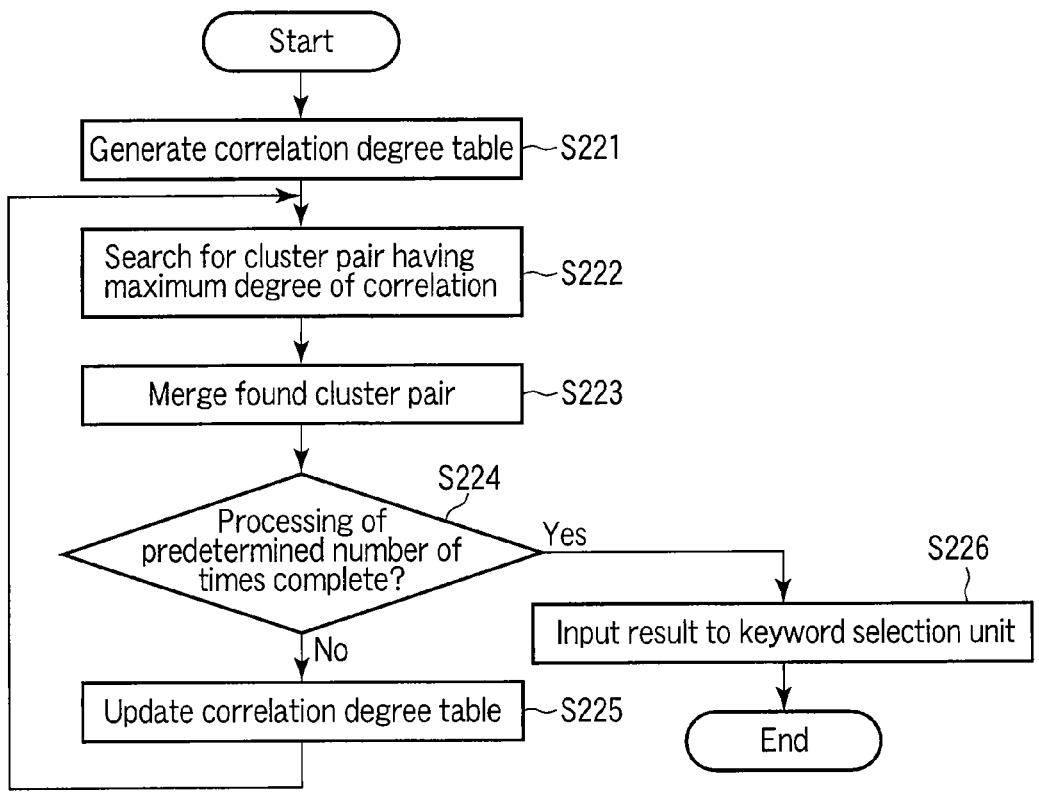
FIG. 9 is a flowchart exemplifying the operation of a basic term clustering unit in FIG. 1.

An operation example of the basic term clustering unit 107 will be described below with reference to FIG. 9.

Figure 10:
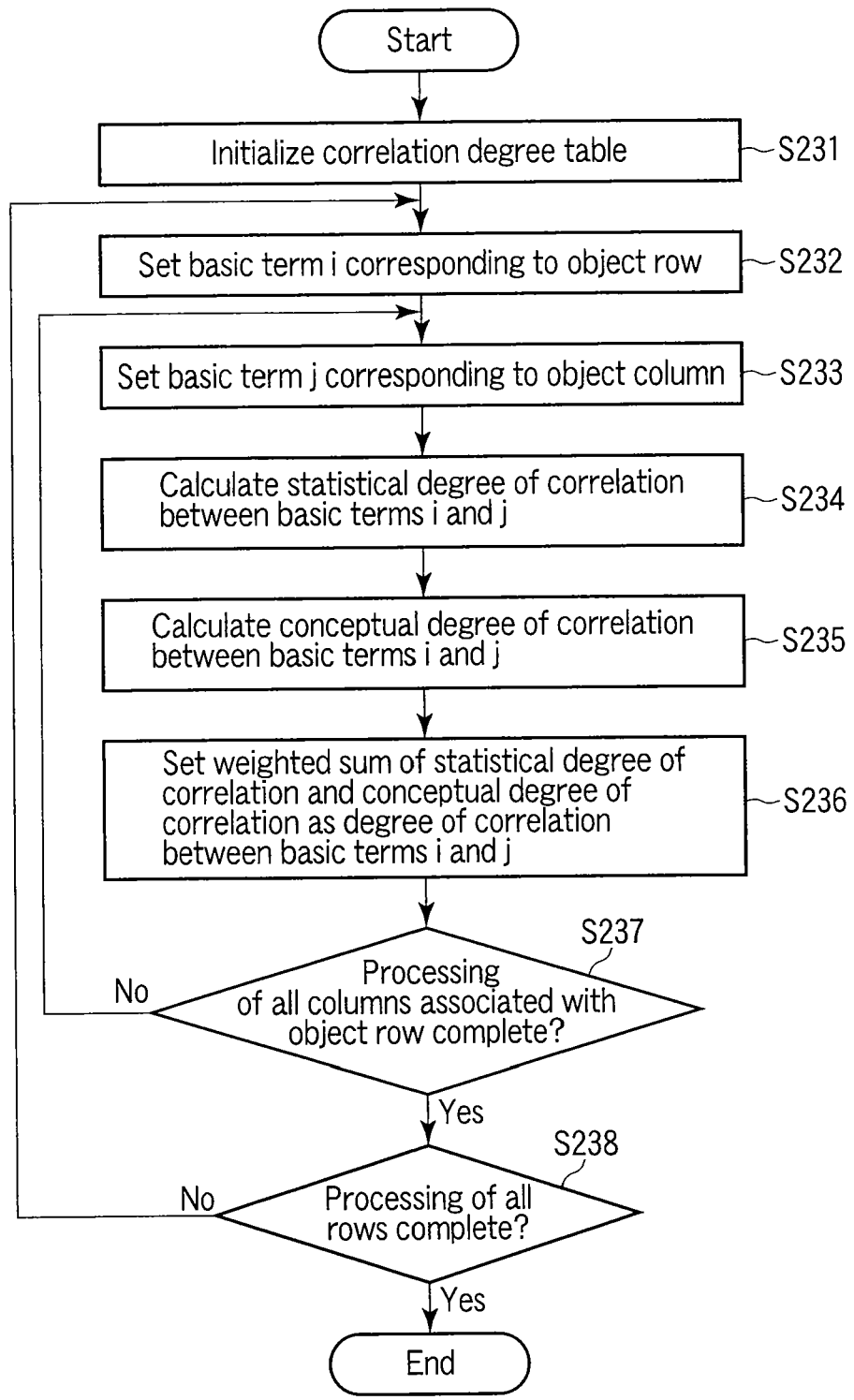
FIG. 10 is a flowchart exemplifying details of correlation degree table generation processing in FIG. 9.

The basic term clustering unit 107 generates a correlation degree table among the basic terms selected by the basic term selection unit 106 (step S221). Note that details of the process in step S221 is exemplified in FIG. 10.

When the process in step S221 starts, the basic term clustering unit 107 initializes the correlation degree table (step S231), and the process advances to step S232. As exemplified in FIG. 11, basic terms are set in the correlation degree table in row and column directions, and a degree of correlation between a basic term set in the i-th row and that set in the j-th column is set in a field specified by the i-th row and j-th column (i and j are natural numbers less than or equal to the total number of basic terms). Note that a degree of correlation set in a field specified by the i-th row and j-th column is equal to that set in a field specified by j-th row and i-th column, and a degree of correlation set in a field specified by the i-th row and i-th column is not necessary. Hence, i and j are variably set so as to meet j>i. In step S231, the basic term clustering unit 107 sets an initial value (for example, 0) in each element of the correlation degree table.

In step S232, the basic term clustering unit 107 sets a basic term i corresponding to an object row (i-th row), and the process advances to step S233. In step S233, the basic term clustering unit 107 sets a basic term j corresponding to an object column (j-th column [j>i]). The basic term clustering unit 107 calculates a statistical degree of correlation (for example, based on a co-occurrence relationship) between the basic terms i and j (step S234), and also calculates a conceptual degree of correlation between them (step S235). Note that steps S234 and S235 may be performed in an arbitrary order.

The statistical degree of correlation is calculated based on the document set stored in the document set storage unit 100. More specifically, the basic term clustering unit 107 generates an appeared document vector i by giving values 1/0 according to the appearance/non-appearance of the basic term i in respective documents included in the document set, and similarly generates an appeared document vector j by giving values 1/0 according to the appearance/non-appearance of the basic term j in respective documents. Note that the number of elements of each of the appeared document vectors i and j is equal to the total number of documents used for generating the vectors (in this case, the total number of documents included in the document set). The basic term clustering unit 107 calculates a cosine value of the appeared document vectors i and j as a statistical degree of correlation.

The conceptual degree of correlation is calculated based on the general concept dictionary stored in the general concept dictionary storage unit 102. More specifically, the basic term clustering unit 107 uses the number of edges between a node of the basic term i and that of the basic term j in the general concept dictionary. The basic term clustering unit 107 calculates 1/(number of edges−1) as a conceptual degree of correlation.

The basic term clustering unit 107 calculates a weighted sum of the statistical degree of correlation calculated in step S234 and the conceptual degree of correlation calculated in step S235, and sets it as a degree of correlation between the basic terms i and j (step S236).

In step S236, typically, uniform weights (for example, ½ and ½) are assigned to the statistical degree of correlation and conceptual degree of correlation. The uniform weighting means to calculate an arithmetic mean value of the two values. On the other hand, the basic term clustering unit 107 may perform non-uniform weighting. For example, since statistical analysis such as co-occurrence relationship determination is not always suited to a small-scale document set, weighting, which weights the conceptual degree of correlation heavier with decreasing total number of documents included in the document set, is made, thus allowing to calculate a reasonable degree of correlation independently of the document set scale. Alternatively, the basic term clustering unit 107 may dynamically update weights according to the total number of documents included in the document set. According to this processing, when the number of documents is decreased as a result of, for example, a refined search, dynamic weighting that heavily weights the conceptual degree of correlation can be made. Furthermore, when non-uniform weights are given, one weight may be set to be 0. When one weight is set to be 0, a corresponding step (step S234 or S235) may be skipped.

For example, the basic term clustering unit 107 sets a basic term "screen" corresponding to the first row in step S232, and sets a basic term "image" corresponding to the second column in step S233. If the basic term "screen" appears in 50 documents, the basic term "image" appears in 50 documents, and both the basic terms "screen" and "image" appear in 20 documents, the basic term clustering unit 107 calculates, as a statistical degree of correlation, a cosine value=20(sqrt(50)× sqrt(50))=0.4 of the appeared document vectors of the basic terms "screen" and "image" (step S234). Also, when the general concept dictionary shown in FIG. 3 is to be referred to, the basic term clustering unit 107 calculates, as a conceptual degree of correlation, 1/(3−1)=0.5 using the number of edges=3 between a node of the basic term "screen" and that of the basic term "image" (step S235). The basic term clustering unit 107 calculates a weighted sum 0.45 of the statistical degree of correlation 0.4 and conceptual degree of correlation 0.5 using, for example, uniform weights (½ and ½), and sets it as a degree of correlation between the basic terms "screen" and "image (step S236).

If the processing of all columns with regard to the object row (i-th row) is complete, the process advances to step S238; otherwise, the process returns to step S233 (step S237). If the processing associated with all rows is complete in step S237, the process in step S221 ends; otherwise, the process returns to step S232. As a result of a series of processes shown in FIG. 10, for example, the correlation degree table shown in FIG. 11 is generated.

After completion of step S221, the process advances to step S222. In step S222, the basic term clustering unit 107 searches the correlation degree table for a cluster pair having a maximum degree of correlation. In the example of FIG. 9, assuming that each individual basic term forms one cluster, these clusters are merged in turn by iterative processing, thus obtaining a final clustering result. That is, it is regarded that the correlation degree table shown in FIG. 11 shows degrees of correlation between clusters before they are merged (that is, clusters each formed by one basic term).

Note that in order to avoid basic terms from being concentrated on a specific cluster, exception processing can be performed in step S222. For example, when a ratio of the number of documents, in which at least one of basic terms, that form a specific cluster, appears, to the total number of documents is greater than or equal to a predetermined value, the basic term clustering unit 107 may exclude that specific cluster from an object to be merged.

The basic term clustering unit 107 merges the cluster pair found in step S222 (step S223). If the processes in steps S222 and S223 have been performed a predetermined number of times, the process advances to step S226; otherwise, the process advances to step S225. Note that since the two clusters are merged into one in step S223, the total number of clusters is decreased by 1. More specifically, as a result of iterative processing of the predetermined number of times, the total number of clusters is decreased by the predetermined number of times.

In step S225, the basic term clustering unit 107 updates the correlation degree table in association with merging of the cluster pair in step S223. A degree of correlation between clusters formed by a plurality of basic terms can be calculated according to, for example, a single linkage method. According to the single linkage method, a maximum value of degrees of correlation between basic terms which form one cluster and those which form the other cluster is calculated as a degree of correlation between these two clusters. In step S226, the basic term clustering unit 107 inputs the clustering result to the keyword selection unit 108, thus ending the processing.

For example, according to the correlation degree table shown in FIG. 11, a degree of correlation 0.5 between a cluster ("screen") and cluster ("video") is maximum. Therefore, the basic term clustering unit 107 merges the clusters ("screen") and ("video") to form a cluster ("screen", "video") in step S223. Then, the basic term clustering unit 107 updates degrees of correlation between the merged cluster ("screen", "video") and other clusters in step S225. For example, according to the single linkage method, a degree of correlation between the cluster ("screen", "video") and a cluster ("image") is updated to max(0.45, 0.3)=0.45, and a degree of correlation between the cluster ("screen", "video") and a cluster ("display") is updated to max(0.41, 0.34)=0.41. When the processes in steps S222 to S225 are iterated seven times based on the correlation degree table shown in FIG. 11, for example, a clustering result including three clusters shown in FIG. 12 is obtained.

The keyword selection unit 108 selects keywords according to the clustering result from the basic term clustering unit 107. For example, the keyword selection unit 108 selects some or all of basic terms which form each cluster as keywords of that cluster. Furthermore, the keyword selection unit 108 may select a representative technical term of each cluster from the technical term list according to the clustering result. The keyword selection unit 108 inputs a keyword selection result to the keyword presentation UI 109. An operation example performed when the keyword selection unit 108 selects representative technical terms will be described below with reference to FIG. 13.

Initially, step S241 is performed. In step S241, the keyword selection unit 108 acquires all documents in which at least one of basic terms that form an object cluster appears from the document set storage unit 100. The keyword selection unit 108 selects representative technical terms of the object cluster based on the documents acquired in step S241 (step S242). For example, the keyword selection unit 108 may select, as representative technical terms, a predetermined number of technical terms in descending order of frequency of occurrence in the documents acquired in step S241, or may select, as representative technical terms, technical terms having frequencies of occurrence, which are greater than or equal to a predetermined value. Alternatively, the keyword selection unit 108 may select representative technical terms using a technique described in a reference (Robertson, R. E., et al. Simple, Proven Approaches to Text Retrieval. University of Cambridge Technical Report. 356, 12, 1994, pp 1-8).

According to the above reference, an evaluation value RW(w) for a technical term w is defined by:

$$RW(w) = r * \log \frac{(r+0.5)(N-n-R+r+0.5)}{(n-r+0.5)(R-r+0.5)} \quad (2)$$

where r represents the number of documents in which the technical term w appears of those acquired in step S241, N represents the total number of documents stored in the document set storage unit 100, n represents the number of documents in which the technical term w appears of those which are stored in the document set storage unit 100, and R represents the total number of documents acquired in step S241. The keyword selection unit 108 may select, as representative technical terms, a predetermined number of technical terms in descending order of evaluation value RW(w), or may select, as representative technical terms, technical terms having the evaluation values RW(w) which are greater than or equal to a predetermined value. Note that when the keyword selection unit 108 selects not all but some of basic terms which form each cluster as keywords, it may similarly use the frequencies or occurrence or evaluation values RW(w).

When the processing for all clusters is complete, the processing ends; otherwise, the process returns to step S241. That is, the keyword selection unit 108 applies the processes in steps S241 and S242 to all the clusters. By a series of processes shown in FIG. 13, for example, a selection result of representative technical terms shown in FIG. 14 is obtained.

The keyword presentation UI 109 presents the keyword selection result from the keyword selection unit 108 via, for example, a display device. The keyword presentation UI 109 represents keywords in a format shown in, for example, FIG. 15. The keyword presentation format is not particularly limited. However, it is preferable to allow the user to easily recognize differences among clusters. Typically, the differences among clusters are attained by, for example, display positions, display periods, display sizes, display colors, and markings of keywords selected for respective clusters. Furthermore, all of keywords selected for respective clusters need not always be presented together. For example, the keyword presentation UI 109 may display some of keywords (for example, basic terms, keywords selected for some clusters) first, and may additionally or alternately display other keywords (for example, representative technical terms, keywords selected for other clusters) in response to a user operation.

As described above, the keyword presentation apparatus according to the first embodiment individually extracts basic term candidates and technical terms from a document set, and selects basic term candidates having high relevancies with the extracted technical terms as basic terms. Therefore, according to the keyword presentation apparatus of this embodiment, since basic terms having high relevancies with technical terms are selected, the user can easily estimate basic term—technical term relationships upon presentation of keywords.

Also, the keyword presentation apparatus according to this embodiment clusters the selected basic terms based on weighted sums of the conceptual and statistical degrees of correlation, and selects and presents keywords according to the clustering result. Therefore, according to the keyword presentation apparatus of this embodiment, since degrees of correlation between basic terms can be reasonably evaluated irrespective of the document set scale, adequate clustering can be attained. Since basic terms which form respective clusters are presented as keywords, the user can easily ascertain overviews of respective clusters. Since technical terms are also presented as keywords together, the user can also easily ascertain concrete contents of respective clusters.

Second Embodiment

As shown in FIG. 16, a keyword presentation apparatus according to the second embodiment includes a document set storage unit 100, basic term candidate extraction unit 101, general concept dictionary storage unit 102, basic term candidate list storage unit 103, technical term extraction unit 104, technical term list storage unit 105, basic term selection unit 306, basic term clustering unit 307, keyword selection unit 308, keyword presentation UI 309, selected keyword list storage unit 310, and document search unit 311. Note that the same reference numerals in this embodiment denote the same parts as in the first embodiment, and differences will be mainly described.

The keyword presentation UI 309 not only presents keywords to the user, but also accepts one or a plurality of selection inputs of the presented keywords. For example, as shown in FIGS. 20 and 21, the keyword presentation UI 309 may present keywords and graphical user interface (GUI) components (for example, check boxes) used to select the keywords. The keyword presentation UI 309 stores keywords selected by the user (referred to as selected keywords hereinafter) in the selected keyword list storage unit 310. Note that such inputs may be accepted by a UI (not shown) different from the keyword presentation UI 309. The keyword presentation apparatus according to this embodiment re-selects and presents keywords based on the selected keywords.

Furthermore, the keyword presentation UI 309 may present a result of a refined search conducted using the selected keywords, as will be described later. Typically, the keyword presentation UI 309 presents titles of respective document included in a found document set in a list format. The keyword presentation UI 309 may alternatively or additionally present information associated with respective documents such as excerpts of respective documents, abstracts of respective documents, contexts including selected keywords in respective documents, and keywords included in respective documents.

The selected keyword list storage unit 310 stores selected keywords from the keyword presentation UI 309, for example, in a list format shown in FIGS. 19 and 22. Note that the selected keyword list storage unit 310 preferably stores selected keywords in a format in which at least a previously selected keyword is identifiable.

The document search unit 311 reads out the selected keywords from the selected keyword list storage unit 310, and applies a refined search to a document set stored in the document set storage unit 100 using the selected keywords. Typically, the document search unit 311 searches the document set for documents including a previously selected keyword. Note that if there are a plurality of previously selected keywords, the document search unit 311 may conduct an OR search or an AND search using the plurality of selected keywords.

The document search unit 311 inputs a set of found documents (also referred to as a partial document set hereinafter) to the basic term clustering unit 307, keyword selection unit 308, and keyword presentation UI 309. Note that when the selected keyword list storage unit 310 does not store any selected keyword, the document search unit 311 inputs a document set stored in the document set storage unit 100 to the basic term clustering unit 307, keyword selection unit 308, and keyword presentation UI 309.

The basic term selection unit 306 switches an operation according to lexical categories of the selected keyword with reference to the selected keywords stored in the selected keyword list storage unit 310. More specifically, the basic term selection unit 306 limits lexical categories to be selected as basic terms according to selection lexical category setting rules shown in FIG. 18.

According to the example shown in FIG. 18, if a previously selected keyword belongs to a lexical category "sahen-nouns" (the sahen-noun is a verbal noun in Japanese and it works as verb in the form of "sahen-nouns+SURU"), the basic term selection unit 306 selects a basic term candidate matching for a category "other nouns" (that is, nouns other than sahen-nouns) (or it preferentially selects a matched basic term candidate). On the other hand, if a previously selected keyword belongs to a lexical category "other nouns", the basic term selection unit 306 selects a basic term candidate matching for "sahen-nouns" (or it preferentially selects a matched basic term candidate). According to this operation, when a previously selected keyword corresponds to the category "sahen-nouns" and suggests "action", a basic term which belongs to the category "other nouns" and suggests "object" of that "action" tends to be selected. When a previously selected keyword belongs to the category "other nouns" and suggests "object", a basic term which belongs to the category "sahen-nouns" and suggests "action" on that "object" tends to be selected. That is, according to this operation, a relationship between the selected keyword and a keyword which is re-selected based on the selected keyword ("action"—"object" or "object"—"action") is easily clarified.

When no previously selected keyword is available (that is, a first time), the basic term selection unit 306 selects a basic term candidate matching for, for example, the category "sahen-nouns" (or it preferentially selects the matched basic term). Since the category "sahen-nouns" allows implementation of more appropriate clustering than the category "other nouns", it is suitable for the first selection lexical category. Of course, in FIG. 18, such selection lexical category may be replaced by a category "sahen-nouns"+"other nouns" (that is, whole "nouns") as in the first embodiment or by "other nouns".

Furthermore, when a previously selected keyword corresponds not to a basic term but to a technical term, the basic term selection unit 306 selects a basic term candidate matching for a category "nouns". Of course, in FIG. 18, such selection lexical category may be replaced by the category "sahen-nouns" or "other nouns". Note that when a plurality of keywords are selected together, an arbitrary selection lexical category may be uniformly set, or the plurality of selected keywords may undergo arbitrary analysis (for example, a search for a lexical category corresponding to a large number of matches), and a selection lexical category may be selected based on that result.

Figure 17:
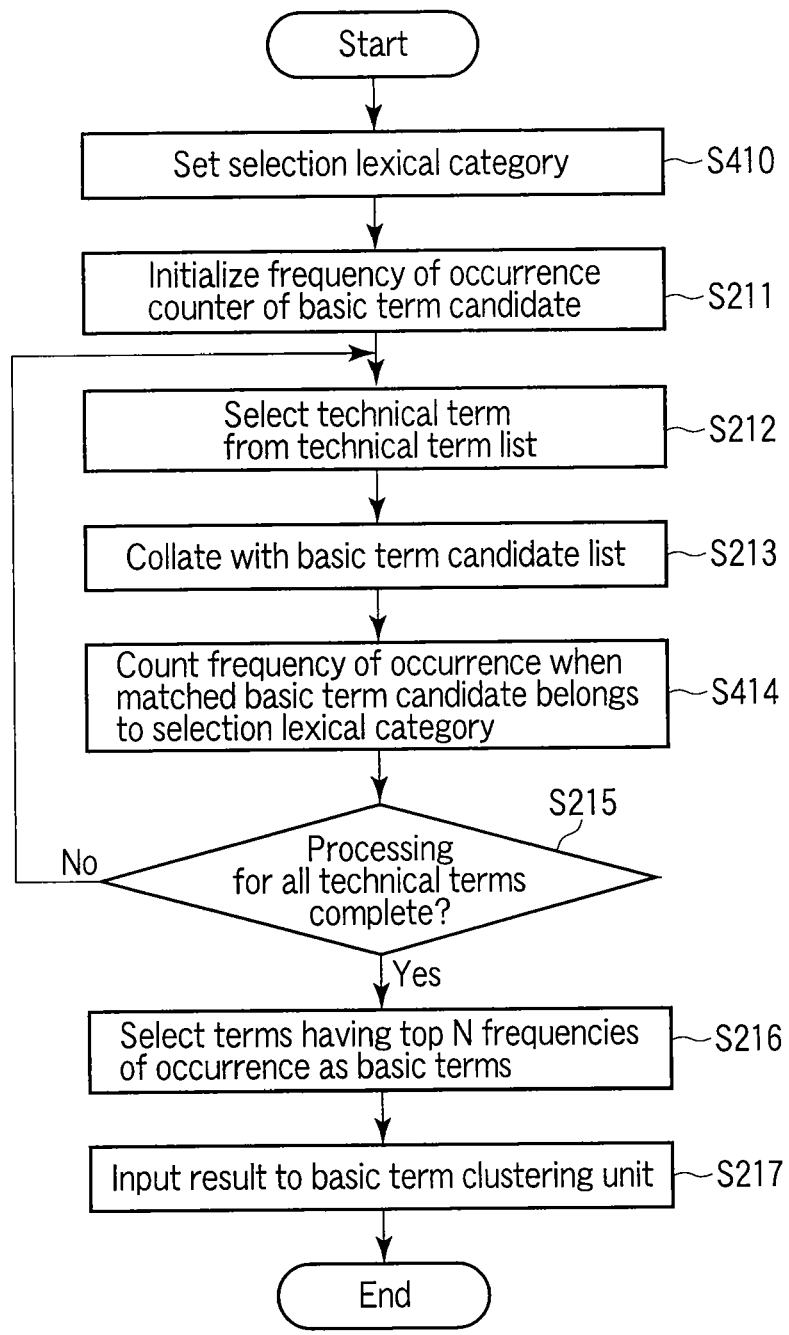
FIG. 17 is a flowchart exemplifying the operation of a basic term selection unit in FIG. 16.

An operation example of the basic term selection unit 306 will be described below with reference to FIG. 17. Note that a description of common processes between FIGS. 17 and 7 will be omitted.

Before the process advances from step S211 to step S212, the basic term selection unit 306 sets a selection lexical category according to a previously selected keyword (step S410). Note that the processing order of steps S410 and S211 may be opposite to that in FIG. 17.

In step S414, the basic term selection unit 306 counts the frequency of occurrence of a basic term candidate which matches a part (that is, a partial character string) of an object technical term and matches the selection lexical category set in step S410.

For example, when no previously selected keyword is available, the basic term selection unit 306 selects the category "sahen-nouns" as a selection lexical category according to the selection lexical category setting rules exemplified in FIG. 18 in step S410. Then, if the object technical term is "image search", the basic term selection unit 306 counts the frequency of occurrence of a basic term candidate "search" which matches a part of "image search" and matches the category "sahen-nouns" in step S414. After that, assume that this "search" is presented as one of keywords, and is selected by the user. The basic term selection unit 306 restarts the operation exemplified in FIG. 17 in response to selection of the keyword.

Since the previously selected keyword is "search" (sahen-nouns), the basic term selection unit 306 sets the category "other nouns" as a selection lexical category according to the selection lexical category setting rules exemplified in FIG. 18 in step S410. Then, if the object technical term is "image search", the basic term selection unit 306 counts the frequency of occurrence of a basic term candidate "image" which matches a part of "image search" and matches the category "other nouns" in step S414.

The basic term clustering unit 307 clusters basic terms selected by the basic term selection unit 306 to form a plurality of clusters as in the basic term clustering unit 107. However, the basic term clustering unit 307 calculates the aforementioned statistical degree of correlation based on a document set from the document search unit 311. The basic term clustering unit 307 inputs the clustering result to the keyword selection unit 308.

In order to avoid basic terms from being concentrated on a specific cluster, the basic term clustering unit 307 may perform exception processing upon merging of clusters. For example, when a ratio of the number of documents in which at least one of basic terms which form a specific cluster to the total number of documents input from the document search unit 311 is greater than or equal to a predetermined value, the basic term clustering unit 307 may exclude the specific cluster from an object to be merged.

The keyword selection unit 308 performs processing which is the same as or similar to that of the keyword selection unit 108 based on the document set from the document search unit 311 after it excludes the selected keywords from selection objects. Especially, since the keyword selection unit 308 performs the processing based on the document set from the document search unit 311, a technical term which has a co-occurrence relationship with a previously selected keyword tends to be selected as a representative technical term.

An operation example of the keyword presentation apparatus according to this embodiment will be described below.

Since there is no previously selected keyword at the time of an initial operation of the basic term selection unit 306, the basic term selection unit 306 sets the category "sahen-nouns" as a selection lexical category according to FIG. 18. Then, the basic term selection unit 306 selects "display", "test", "inspection", "search", "design", "extraction", "classification", and "processing" as basic terms from the basic term candidates. The basic term clustering unit 307 applies clustering to these basic terms to obtain the following clustering result.

Cluster ID 1: "display", "processing"
Cluster ID 2: "test", "inspection"
Cluster ID 3: "search", "classification", "extraction"

The keyword selection unit 308 selects keywords according to the clustering result. For example, the keyword selection unit 308 selects representative technical terms of respective clusters (cluster ID 1: "image processing", "screen display", cluster ID 2: "unit test", "general inspection", "combined test", cluster ID 3: "image search", "document classification", "information extraction"), and inputs the basic terms and representative technical terms to the keyword presentation UI 309 as keywords. The keyword presentation UI 309 presents the keywords in, for example, a format shown in FIG. 20.

The user selects, for example, "search" of the presented keywords (for example, the user checks a check box presented at the left neighboring position of "search" in FIG. 20). This selected keyword "search" is stored in the selected keyword list storage unit 310 in, for example, a format shown in FIG. 19. The document search unit 311 reads out the selected keyword "search" from the selected keyword list storage unit 310, and conducts an refined search of a document set stored in the document set storage unit 100 using the selected keyword "search". Typically, the document search unit 311 searches the document set for documents including the selected keyword "search". The document search unit 311 inputs a partial document set to the basic term clustering unit 307, keyword selection unit 308, and keyword presentation UI 309.

Upon reception of the previously selected keyword "search" (sahen-noun), the basic term selection unit 306 sets the category "other nouns" as a selection lexical category. Then, the basic term selection unit 306 selects "image", "document", "concept", "full text", "unit", "error", "basic", "screen", "detail", and "index" as basic terms from the basic term candidates. The basic term clustering unit 307 applies clustering to these basic terms to obtain the following clustering result. Note that the basic term clustering unit 307 calculates statistical degrees of correlation between basic terms based on a partial document set from the document search unit 311, as described above.

Cluster ID 1: "document", "concept", "full text", "index"
Cluster ID 2: "image", "screen"
Cluster ID 3: "unit", "error", "basic", "detail"

The keyword selection unit 308 selects keywords according to the clustering result. For example, the keyword selection unit 308 selects representative technical terms of respective clusters (cluster ID 1: "document search", "conceptual search", "lexical search", cluster ID 2: "image search", "image index", cluster ID 3: "search error", "basic design", "detailed design"), and inputs some of the basic terms and representative technical terms to the keyword presentation UI 309 as keywords. The keyword presentation UI 309 presents the keywords in, for example, a format shown in FIG. 21. Furthermore, in the example of FIG. 21, the keyword presentation UI 309 presents titles of documents included in a document set found using the selected keyword "search" in a list format.

The user can further select, for example, "lexical index" of the presented keywords. Since the selected keyword "lexical index" is added, the storage contents of the selected keyword list storage unit 310 are updated, as shown in FIG. 22. When a keyword is additionally selected, the previously selected keyword (in this example, "search") can be handled by various techniques. For example, the previously selected keyword "search" may be simply discarded, or by determining that a plurality of keywords "search" and "lexical index" are simultaneously selected, the keyword re-selection and presentation processes may be performed. Furthermore, the previously selected keyword "search" may be used in decision of the priority levels (for example, a presentation order) of respective documents included in a found document set without being used in a refined search of documents and selection of keywords. For example, the keyword presentation UI 309 may calculate Term Frequency (TF)—Inverse Document Frequency (IDF) values of the previously selected keyword "search" for a partial document set based on the selected keyword "lexical search", and may present information associated with documents in a ranking format in descending order of calculated value.

As described above, the keyword presentation apparatus according to the second embodiment conducts a refined search for a document set using a selected keyword from the user, re-clusters basic terms, and re-selects keywords. Therefore, according to the keyword presentation apparatus of this embodiment, keywords which are related to a keyword selected by the user can be re-selected and presented.

For example, a program which implements the processing of each of the aforementioned embodiments can be provided while being stored in a computer-readable storage medium. A storage format of the storage medium is not particularly limited as long as the storage medium can store a program and is readable by a computer. For example, a magnetic disc, optical discs (for example, a CD-ROM, CD-R, or DVD), magneto-optical disc (for example, an MO), and semiconductor memory may be used. Also, the program which implements the processing of each embodiment may be stored in a computer (server) connected to a network (for example, the Internet), and may be downloaded by another computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A keyword presentation apparatus comprising:
a first extraction unit, which when executed by a computer, is configured to extract, as basic term candidates, morpheme strings, which are defined in a predetermined general concept dictionary, from a document set;
a second extraction unit, which when executed by the computer, is configured to extract, as technical terms, morpheme strings, which are not defined in the general concept dictionary, from the document set;
a first selection unit, which when executed by the computer, is configured to evaluate relevancies between each of the basic term candidates and the technical terms, and to preferentially select basic term candidates having high relevancies as basic terms;
a clustering unit, which when executed by the computer, is configured to calculate statistical correlation degrees between the basic terms based on the document set, to calculate conceptual correlation degrees between the basic terms based on the general concept dictionary, and to cluster the basic terms based on weighted sums of the statistical correlation degrees and the conceptual correlation degrees;
a second selection unit, which when executed by the computer, is configured to select keywords of respective clusters from the basic terms and the technical terms based on a clustering result of the basic terms; and
a presentation unit, which when executed by the computer, is configured to present the selected keywords on a display device.

2. The apparatus according to claim 1, wherein a weight given to the conceptual correlation degree becomes relatively larger than a weight given to the statistical correlation degree as a total number of documents included in the document set becomes smaller.

3. The apparatus according to claim 1, further comprising a search unit configured to conduct a refined search for the document set using a keyword selected from keywords presented by the presentation unit, and to obtain a partial document set, and wherein
the clustering unit calculates the statistical correlation degrees between the basic terms based on the partial document set, calculates the conceptual correlation degrees between the basic terms based on the general concept dictionary, and re-clusters the basic terms based on the weighted sums,
the second selection unit re-selects keywords of respective clusters from the basic terms and the technical terms based on a re-clustering result of the basic terms, and
the presentation unit presents the re-selected keywords.

4. The apparatus according to claim 3, wherein the first selection unit preferentially re-selects basic term candidates, which match a lexical category decided by the keyword selected from keywords presented by the presentation unit and have high relevancies, as the basic terms.

5. The apparatus according to claim 3, wherein the presentation unit decides priority levels of respective documents included in the partial document set using a previously selected keyword, and presents information associated with respective documents included in the partial document set according to the priority levels.

6. The apparatus according to claim 1, wherein the first extraction unit applies morphological analysis to documents included in the document set, and extracts morpheme strings, which match a predetermined part of speech, and are defined in the general concept dictionary, as the basic term candidates.

7. The apparatus according to claim 1, wherein the second extraction unit determines based on appearance patterns of morpheme strings in the document set whether or not each morpheme string is an independent term, and extracts morpheme strings, which are determined as independent terms, and are not defined in the general concept dictionary, as the technical terms.

8. The apparatus according to claim 1, wherein the second selection unit acquires documents, which include at least one basic terms that form respective clusters in the clustering result, from the document set, selects keywords of the respective clusters from the technical terms based on a number of appeared documents of the technical terms in the acquired documents, and further selects some or all of the basic terms that form the respective clusters as keywords of the respective clusters.

9. A keyword presentation method comprising:
extracting via a computer program executed by a computer, as basic term candidates, morpheme strings, which are defined in a predetermined general concept dictionary, from a document set;
extracting via the computer program executed by the computer, as technical terms, morpheme strings, which are not defined in the general concept dictionary, from the document set;
evaluating via the computer program executed by the computer relevancies between each of the basic term candidates and the technical terms, and preferentially selecting basic term candidates having high relevancies as basic terms;
calculating via the computer program executed by the computer statistical correlation degrees between the basic terms based on the document set, calculating conceptual correlation degrees between the basic terms based on the general concept dictionary, and clustering the basic terms based on weighted sums of the statistical correlation degrees and the conceptual correlation degrees;
selecting via the computer program executed by the computer keywords of respective clusters from the basic terms and the technical terms based on a clustering result of the basic terms; and
presenting via the computer program executed by the computer the selected keywords on a display device.

10. A non-transitory computer readable medium storing instructions of a computer program which executed by a computer results in performance of steps comprising:
extracting, as basic term candidates, morpheme strings, which are defined in a predetermined general concept dictionary, from a document set;
extracting, as technical terms, morpheme strings, which are not defined in the general concept dictionary, from the document set;
evaluating relevancies between each of the basic term candidates and the technical terms, and preferentially selecting basic term candidates having high relevancies as basic terms;
calculating statistical correlation degrees between the basic terms based on the document set, calculating conceptual correlation degrees between the basic terms based on the general concept dictionary, and clustering the basic terms based on weighted sums;
selecting keywords of respective clusters from the basic terms and the technical terms based on a clustering result of the basic terms; and
presenting the selected keywords of the statistical correlation degrees and the conceptual correlation degrees.

* * * * *